United States Patent [19]

Le Floch et al.

[11] Patent Number: 5,228,025
[45] Date of Patent: Jul. 13, 1993

[54] METHOD FOR THE BROADCASTING OF DIGITAL DATA, NOTABLY FOR RADIO BROADCASTING AT A HIGH BIT-RATE TOWARDS MOBILE RECEIVERS, WITH TIME-FREQUENCY INTERLACING AND ASSISTANCE IN THE ACQUISITION OF AUTOMATIC FREQUENCY CONTROL, AND CORRESPONDING RECEIVER

[75] Inventors: Bernard Le Floch; Jean-Christophe Rault, both of Rennes; Daniel Pommier, Breal Sous Montfort; Damien Castelain, Rennes, all of France

[73] Assignees: Centre National d'Etudes des Telecommunications; Telediffusion de France, both of France

[21] Appl. No.: 648,188

[22] Filed: Jan. 31, 1991

[30] Foreign Application Priority Data

Feb. 6, 1990 [FR] France ............................... 90 01492

[51] Int. Cl.[5] .............................................. H04J 1/02
[52] U.S. Cl. ........................................ 370/20; 370/50; 370/70
[58] Field of Search ............ 370/50, 70, 100, 95.3, 370/23, 18, 19, 20, 21, 71, 73, 76

[56] References Cited

U.S. PATENT DOCUMENTS

| | | | |
|---|---|---|---|
| 3,435,147 | 3/1969 | Malm | 370/50 |
| 3,855,533 | 12/1974 | Schueli | 370/20 |
| 4,009,343 | 2/1977 | Markey | 370/95.3 |
| 4,206,320 | 6/1980 | Keasler et al. | 370/19 |
| 4,688,210 | 8/1987 | Eizenhöfer et al. | 370/18 |

FOREIGN PATENT DOCUMENTS 2206768A 1/1989 United Kingdom .

OTHER PUBLICATIONS

Alard, et al., "Principles of modulation and channel coding for digital broadcasting for mobile receivers", EBU Review-Technical, No. 224, Aug. 1987, pp. 168-189.

Alard, et al., "A New System of Sound Broadcasting to Mobile Receivers". IEEE Transactions on Telecommunications, pp. 416-420.

Pennington, "Techniques for medium-speed data transmission over HF channels", IEE Proceedings, vol. 136, Pt. I, No. 1, Feb. 1989, pp. 11-19.

Primary Examiner—Douglas W. Olms
Assistant Examiner—Melvin Marcelo
Attorney, Agent, or Firm—Locke Reynolds

[57] ABSTRACT

A method for the broadcasting of digital data, in channels to which multiple paths are assigned, the characteristics of which vary in time, with time-frequency interlacing and assistance in the acquisition of the automatic frequency control. This method is one of the type providing for the distribution of the data in the form of digital elements in the frequency-time space f-t and the transmission of frames of symbols each constituted by a multiplex of N orthogonal carrier frequencies modulated by a set of the digital elements and broadcast simultaneously, the method providing for the transmission of a pattern of frequency synchronization, recurrent in time. It can be applied notably for radio broadcasting at a high bit rate towards mobile receivers, and for example, to COFDM radio broadcasting.

13 Claims, 3 Drawing Sheets

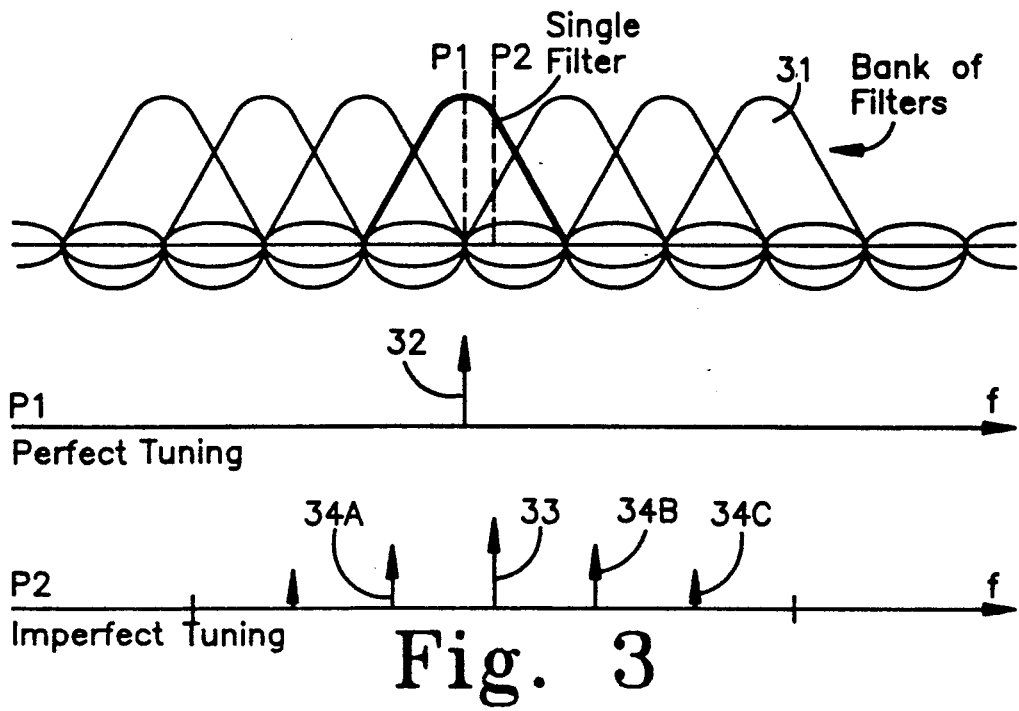
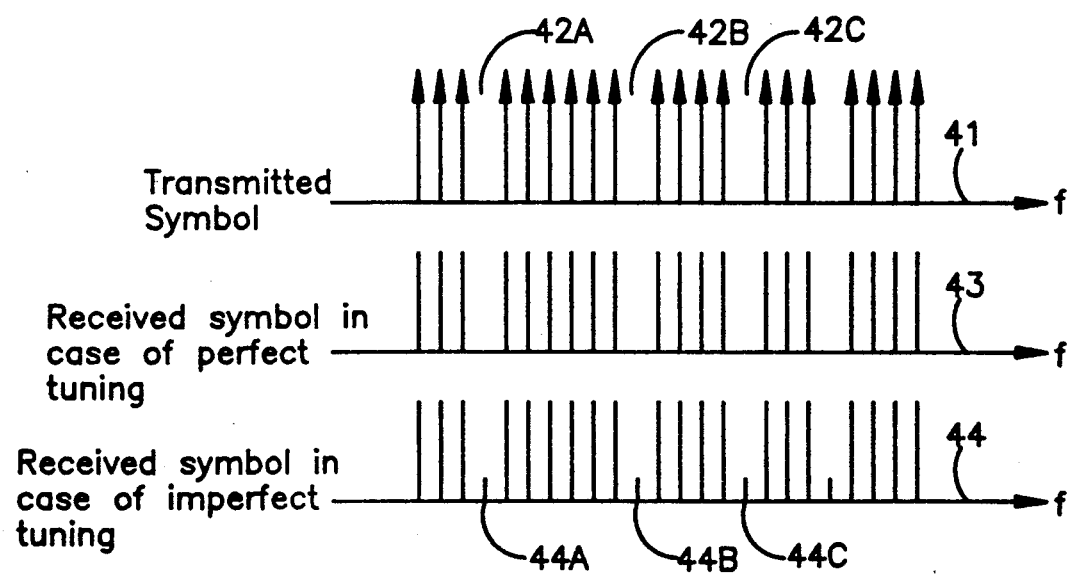

5,228,025

METHOD FOR THE BROADCASTING OF DIGITAL DATA, NOTABLY FOR RADIO BROADCASTING AT A HIGH BIT-RATE TOWARDS MOBILE RECEIVERS, WITH TIME-FREQUENCY INTERLACING AND ASSISTANCE IN THE ACQUISITION OF AUTOMATIC FREQUENCY CONTROL, AND CORRESPONDING RECEIVER

BACKGROUND OF THE INVENTION

1. Field of the Invention

The field of the invention is that of the broadcasting of digital signals in channels allocated multiple to paths, the characteristics of which vary in time.

The invention concerns notably the broadcasting of digital data intended to be received notably by mobile receivers in an urban environment, that is, in the presence of parasites and jamming and under conditions of multiple propagation (the RAYLEIGH law or process) generating phenomena of fading.

The invention can be applied more particularly, but not exclusively, to the system of digital sound broadcasting known as the COFDM (Coding Orthogonal Frequency Division Multiplex) as described in the French patent applications Nos. 86 09622 of Jul. 2, 1986 and 86 13271 of Sep. 23, 1986 filed on behalf of the present applicants.

This system of digital broadcasting is based on the combined use of a channel coding device and a method of modulation by orthogonal frequency division multiplexing.

2. Description of the Prior Art

The known encoding method is aimed, notably, at absorbing the effect of variations in amplitude of the received signal, due to the RAYLEIGH process, by an adequate processing of the samples coming from the demodulator. Preferably, a convolutional encoding is used, possibly concatenated with a REED-SOLOMON type of encoding.

The decoding may advantageously be a soft decision type of Viterbi decoding.

The modulation method proper to this prior art system makes it possible to resolve the problems related to the frequency selectivity of the channel. It consists in providing for the distribution of the constituent digital elements of the data signal in the frequency time space f-t, and in simultaneously transmitting sets of digital elements on N parallel broadcasting channels by means of a multiplex of frequencies using orthogonal carriers.

In a known way, the encoded digital elements are furthermore interlaced, in time and in frequency, so as to maximize the statisical independence of the channels with regard to the Rayleigh process and the selective character of the channel.

In particular, this makes it possible to prevent two successive elements of the data train from being transmitted at the same frequency.

The two-dimensional nature of the transmitted signal necessitates the implementation, at the receiver, of a sampling along the two axes, namely the temporal and frequency axes. The determining of the sampling instants in time is the result of the temporal synchronization of the receiver. The frequency sampling arises out of the application of a discrete Fourier transform (DFT) on the temporal samples.

This transform is equivalent to a bank of orthogonal filters, the position of which, in the frequency domain, is determined by the frequency of the local oscillator. The precision of the sampling in frequency depends, therefore, on the frequency distance between the transmitted signal and this local oscillator.

The known operation, which consists in tuning the frequency of the local oscillator, in the receiver is called automatic frequency control (AFC). A method of application of AFC is described, for example, in M. Alard, R. Halbert, B. Le Floch, D. Pommier, "A New System Of Sound Broadcasting To Mobile Receivers", Eurocon Conference 88.

A frequency shift of the bank of filters, achieved by the Fourier transform, has two distinct effects on the demodulation of a particular carrier of a COFDM signal. Firstly, the distance between the frequency of the transmitted signal and the frequency of the local oscillator introduces a phase error. Furthermore, after Fourier transform, this distance introduces a noise due to the loss of orthogonality between the carrier frequencies, expressing the inter-symbol interference in the frequency domain.

Depending on the precision of the oscillators, it may be that the AFC is not sufficient to provide for efficient locking-in. Thus, in the case of a COFDM system where the distance between carriers is equal to 10 kHz and the carrier frequency is 1 GHz, a precision of $10^{-5}$ of the local oscillator may prompt a shift of a carrier in the demodulator, making any interpretation of the received signal impossible.

The invention is designed to overcome these drawbacks.

SUMMARY OF THE INVENTION

More precisely, the invention is aimed at providing a method of digital broadcasting with time-frequency interlacing in which the acquisition of automatic frequency control is facilitated.

This notably makes it possible to have recourse to the use of a standard precision local oscillator in the receiver.

It is a particular aim of the invention to overcome, firstly, the problem of phase rotation due to the offset of frequencies and, secondly, the problem, specific to the COFDM signal, of loss of orthogonality between the carriers.

The invention is also aimed at providing a method compatible with the structure of the COFDM signal, in using operators already implemented in the receiver to fulfil other functions.

These aims, as well as others which shall appear here below, are achieved, according to the invention, by a method for the broadcasting of digital data, notably for radio broadcasting at a high bit rate towards mobile receivers, of the type providing for the distribution of said data in the form of digital elements in the frequency-time space f-t and the transmission of frames of symbols each constituted by a multiple of N orthogonal carrier frequencies modulated by a set of said digital elements and broadcast simultaneously, said method providing for the transmission of a frequential synchronization pattern recurrent in time.

This method is an inventive transposition, in the field of frequencies, of known methods for the insertion of temporal synchronization words into one-dimensional broadcasting systems.

Advantageously, the frequential synchronization words of the invention take account of and use the various characteristics of a time-frequency interlacing signal, notably of the COFDM type.

Thus, should each of said frames include an analog synchronization symbol of silence, said symbol of silence advantageously includes at least one reference carrier constituting said frequency synchronization pattern.

These reference carriers do not disturb the working of the analog synchronization if their number is small enough.

In one particular embodiment of the invention, these reference carriers are modulated by certain of said digital elements.

In another embodiment, these reference carriers are not modulated, and their phase, at the outset, is chosen so that the envelope resulting from said frequency synchronization pattern is substantially constant.

This may be obtained notably by choosing these phases at the outset in such a way that they follow a relationship of quadratic distribution.

The use of a window with a constant envelope provides for the efficient working of the analog synchronization.

The frequency synchronization pattern may also be formed by the elimination of at least one of said carrier frequencies in at least one of said symbols.

Another preferred embodiment of the invention lies in the use of a service word, known to the receiver, modulating at least one carrier frequency chosen in the frequency domain, in at least certain symbols of said frame.

Said service words are advantageously inserted in the signal at the symbol frequency or at a lower frequency.

Advantageously, in the different embodiments, the distance between the elements constituting a pattern of synchronization is not constant, to prevent a total loss of this pattern in the case of a simple echo.

In one preferred embodiment of the invention, said pattern of synchronization is constituted by a combination of at least two previously described embodiments.

The invention also concerns receivers capable of receiving and analyzing the signals produced by a method such as this.

Advantageously, these receivers include means for the localization of said patterns of frequency synchronization, and means for the tuning of the local oscillator, as a function of said localization.

Said means for tuning the local oscillator may notably tune said local oscillator either to the frequency of the transmitted signal, or so as to lock into the comb with a frequency closest to the oscillation frequency of said local oscillator.

Preferably, said means for tuning the local oscillator cooperate with means for taking account of several results of localization of synchronization patterns.

BRIEF DESCRIPTION OF THE DRAWINGS

Other characteristics and advantages of the invention will appear from the following description of a preferred embodiment of the invention, given as an exemplary and non-restrictive illustration, and from the appended drawings, of which:

FIG. 3 shows the result of the Fourier transform of a reference carrier frequency according to the first type of frequency synchronization pattern according to the invention, in the case of perfect and imperfect tuning of the local oscillator;

FIG. 4 presents the result of the Fourier transform of a synchronization pattern with suppression of carriers in the case of perfect and imperfect tuning;

The different aspects of the embodiment that shall be described hereinafter more particularly concern digital sound radio broadcasting towards mobile receivers.

However, it is clear that the principle of digital broadcasting with a high bit rate, according to the invention, can be applied to any type of communication, notably in channels subjected to the Rayleigh process.

DETAILED DESCRIPTION OF THE INVENTION

One goal in the application of digital sound radio broadcasting may be, for example, the transmission of sixteen stereophonic programs in an 8 MHz wide frequency band with a digital bit rate of the order of 250 kbits after compression by stereophonic program.

Figure 1:
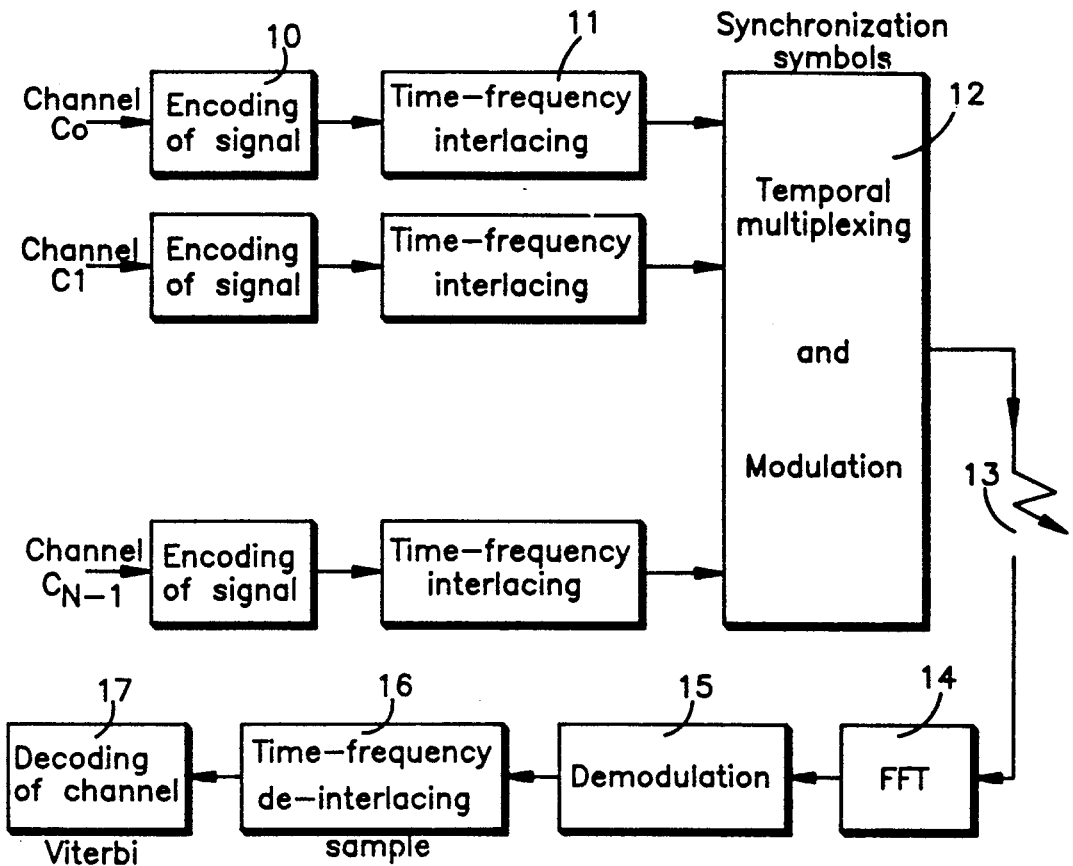
FIG. 1 is a block diagram of a transmission/reception channel implementing the method of the invention.

A transmission chain, such as the one described in the patent applications described in the introduction, is shown in FIG. 1.

Each of the K (16) channels $C_0$ to $C_{k-1}$ undergoes, in parallel, an encoding 10 and then a time-frequency interlacing 11 on a separate channel, before being subjected collectively to a process 12 of time-division multiplexing and OFDM modulation.

The encoding 10 is advantageously of the convolutional type. The time-frequency interlacing 11 is aimed at shuffling the digital elements of each channel in order to give them maximum independence from parasite signals, jamming and fading of the broadcasting channel 13.

The OFDM modulation consists in the modulation of the symbols each formed by a multiplex of orthogonal frequencies broadcast simultaneously on N channels. This operation can be done by a Fourier transform on the encoded and interlaced digital sequence of each channel $C_i$.

For example, in an 8 MHz frequency band, 512 carrier frequencies separated by 15 625 Hz can be defined. Of these, 448 are used, after elimination of the central frequency of the spectrum and of the side carriers (⅛th of the spectrum), to take the filtering constraints into account.

The reception chain comprises the standard steps of filtering and transposition into baseband 14, demodulation 15, time-frequency de-interlacing 16 and decoding 17 of the de-interlaced channel.

Assuming a frequency-division multiplexing of the different channels, the channel selection operation 14 is advantageously carried out by fast Fourier transform (FFT) so as to decimate the set of adequately multiplexed carriers to apply the COFDM demodulation operation only to the carriers of the selected channel (see addition certificate 86 13271 already cited).

Assuming a time-division multiplexing of the different channels, the operation 14 is constituted by a windowing on the symbols of the channel that are the object of the decoding operation, followed by a Fourier transform applied to each of said symbols.

After the time-frequency de-interlacing 16, advantageously, a Viterbi soft decision decoding 17 is applied.

The transmitted signal is formed by a sequence of modulation signals forming a multiplex of N orthogonal carriers.

Let $\{f_k\}$ be the set of carrier frequencies considered, with:

$$f_k = f_0 + k/t_s, k = 0 \text{ to } N-1$$

where $t_s$ represents the time duration allocated to a modulation symbol.

The following base of elementary signals can then be defined as:

$\Psi_{j,k}(t)$ with $k=0$ to $N-1, j = -\infty$ to $+\infty$:

$\Psi_{j,k}(t) = g_k(t - jT_s)$ with:
$0 \leq t \leq T_s$: $g_k(t) = e^{2i\pi f_k t}$
otherwise: $g_k(t) = 0$ Furthermore, let us take a set of complex numbers $\{C_{j,k}\}$ taking its values in a finite alphabet, representing the transmitted data signal.

The associated COFDM signal can then be written as follows:

$$x(t) = Re \left( \sum_{j=-\infty}^{+\infty} \sum_{k=0}^{N-1} C_{j,k} \Psi_{j,k}(t) \right)$$

In the example concerned by this application, the transmitted symbols $C_{j,k}$ have a constant module. In other words, this means that each of the carriers of the multiplex undergoes a phase modulation.

To resolve every problem of frequence selectivity of the channel, a guard interval with a duration $\Delta$ is inserted before the useful part of each symbol, in order to absorb the inter-symbol jamming.

$t_s$ therefore represents the time duration of the useful signal, $\Delta$, the duration of the guard interval and $T_s = t_s + \Delta$, the duration of the symbol.

Figure 2:
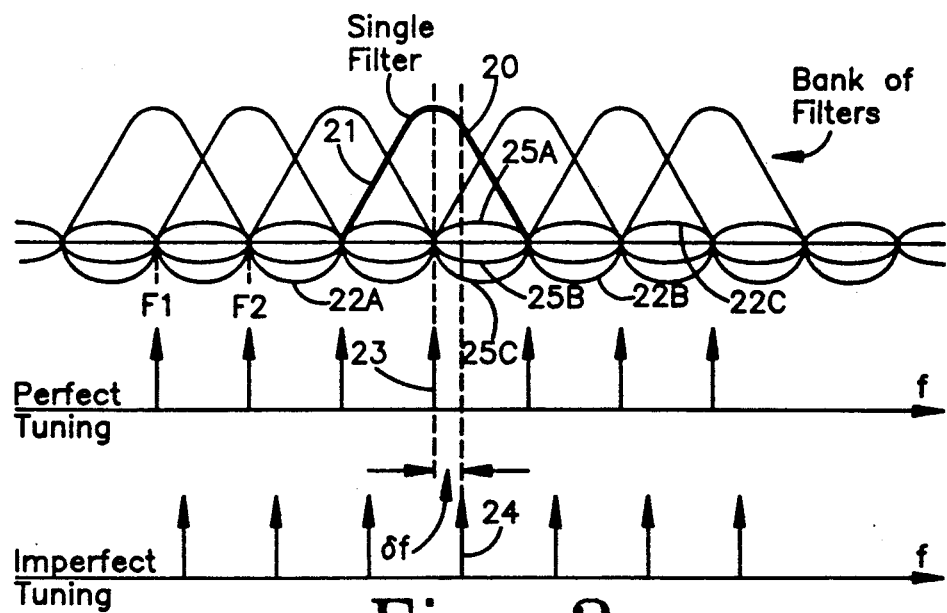
FIG. 2 illustrates the positioning of the carriers received with reference to the frequency response of the Fourier transform in a known type of receiver, in the case of perfect and imperfect tuning of the local oscillator.

FIG. 2 presents the position of the comb of carriers received in relation to the frequency response of the bank of filters achieved by the Fourier transform, in the case of a perfect tuning of the local oscillator, then an imperfect tuning.

The frequency response 20 of each of the filters includes a major lobe 21, which is the useful part of the filter, and secondary lobes $22_A$, $22_B$, $22_C$ creating an inter-carrier interference that gets cancelled at the frequencies $F_1, F_2, \ldots$ corresponding to the maximum of the major lobe of each filter.

When the tuning is perfect, each of the carriers 23 is filtered by a single filter 20. By contrast, when this tuning is imperfect, a frequency distance $\delta f$ appears. This frequency distance prompts an inter-carrier interference noise in the frequency domain, during the filtering of a carrier 24, due to the secondary lobes $25_A$, $25_B$, $25_C \ldots$ Secondly, the result of the filtering is attenuated: the carrier 24 no longer coincides with the maximum of the major lobe 21. This frequency distance adds an error term $\Delta \phi = 2\pi \delta f T_s$, the observation being made on the duration $T_s$ of a symbol.

In a standard way, the AFC is implemented by carrying the demodulated symbols to the power $2^P$ in the complex plane, P being the number of phase states of the modulation. The result of this operation no longer depends on the modulating information, all the values being brought back to the real axis, and gives a measure of the frequency distance $\delta f$, which is taken into account for the tuning of the frequency of the local oscillator.

In the case of the COFDM oscillator, this measurement should be integrated into the two axes, namely the time and frequency axes, in order to achieve the maximum possible elimination of the noise of orthogonality loss and the noise brought by the transmission channel and the receiver.

Depending on the precision of the oscillators, it may be that this method is not sufficient to provide for efficient locking-in. If we consider, for example, a COFDM sstem where the distance between carriers is equal to 10 KHz and where the carrier frequency is 1 GHz, a $10^{-5}$ precision of the local oscillator may prompt a shift of a carrier in the demodulator which, obviously, cannot be managed by the above-described loop.

The invention concerns an advantageous method of assistance in the acquisition of the AFC, making use of the structure of the COFDM signal. This method consists in the insertion of a pattern of frequential synchronization in the transmitted signal.

This approach is an inventive transposition, to the frequency domain, of known methods for the insertion of temporal synchronization words in one-dimensional transmission systems.

The invention notably concerns three means of implementing this method, which may be used alone or according to any of the possible combinations.

The first method of achieving a pattern of temporal synchronization can be applied to the broadcasting methods having an interval of silence at the beginning of each frame, enabling an analog synchronization. A method such as this is described in the patent application No. FR 88 15216, dated Nov. 18, 1988, filed on behalf of the present applicants.

This symbol of silence has a twofold purpose: it enables the synchronization of the receiver in time, and the measurement of the noises and jammers of the channel. However, a small number of pilot carriers or reference carriers can be inserted into this symbol of silence, without modifying the functions thereof.

Thus, for a COFDM signal formed by N carriers, M reference carriers are inserted, M being far smaller than N, for example, M=N/16.

In this case, the envelope of the "zero" symbol remains very small, and therefore easily detectable by the synchronization means. In the same way, the problems of noises and jammings are crucial only when they are far greater than this envelope.

Each of these reference carriers, with a position and value that are known to the receiver, is analyzed so as to detect the differences between the transmitted frequencies and the bank of filters of the receiver.

As shown in FIG. 3, a Fourier transform with N points is applied to the symbol, then the module of the N points of the resultant vector is taken. The shift in the position of the correlation peaks in this vector, in relation to the position of the references, is a direct measurement of the distance $\delta f$ which is taken into account in the tuning of the local oscillator.

If a reference carrier is perfectly tuned with the bank of filters 31 achieved by the Fourier transform, it will be in the position P1. The module of the result of this Fourier transform will then show a single peak 32.

By contrast, in the case of a frequency distance, the reference carrier is in the position P2, offset with respect to the bank of filters. In this case, the module of the result of the Fourier transform includes an attenuated main peak 33 and a series of other peaks $34_A$, $34_B$, $34_C$..., appearing at the other positions of the filter.

Advantageously, the spacing between the reference frequencies is not constant. In the case of a simple echo prompted by the interference of two paths or of a small number of them, the goal is choose the carriers so as to choose the carriers in such a way as to prevent them from being simultaneously affected by a phenomenon of fading. Indeed, it is known that a simple echo leads to a fading that is expressed by a periodic weakening in the frequency domain. Under certain circumstances, there could therefore be a coincidence between these carriers and these fading phenomena.

To cope with this risk, the invention provides for the choosing of several reference frequencies, and for their distribution in the frequency domain as aperiodically as possible. In other words, it is proposed to choose at least three frequencies in such a way that the two consecutive distances have the smallest possible HCD in the frequency domain.

This embodiment makes it possible to cope with the frequent case of simple echos.

These reference frequencies may be information carriers, i.e. they may be modulated by useful or unmodulated digital elements.

Should the reference frequencies be unmodulated, they are chosen in such a way that the envelope resulting from the synchronization pattern is substantially constant. This makes it possible to avoid disturbing the detection of this symbol, during the frame synchronization.

However, a constant envelope such as this may be obtained notably by distributing the phases of each of the reference carriers, at the outset, according to a quadratic distribution relationship.

The second means for achieving a frequency synchronization pattern according to the invention is the elimination of certain carriers in certain symbols of the frame.

The same type of analysis is applied, and the position of the eliminated frequencies, or gaps, gives a direct measurement of the frequency distance δf.

FIG. 4 shows the results of the Fourier transform of a synchronization pattern such as this. The spectrum 41 of the transmitted lines includes gaps $44_A$, $42_B$, $42_C$ which are found identically in the module 43 of the DFT, in the case of the perfect tuning of the frequencies.

By contrast, when the frequency distance δf is not zero, non-zero holes $44_A$, $44_B$, $44_C$ appear in the module 44 of the DFT. Furthermore, the other peaks have degraded and variable levels.

For these two methods, an analysis of the modules of the DFT enables the tuning of the AFC to be corrected.

An integration of the observation in time will make it possible to do away with the unfavorable configurations of the response of the channel, and to reduce the effect of the transmission noise. This integration consists, for example, in taking account of several results of localization of the patterns of synchronization, whether consecutive or not. It is thus possible to compute a sliding mean of these localizations with, as the case may be, a selective weighting of the localizations so as to increase the value, more particularly, of the most recent ones.

Another mode of setting up a pattern of frequential synchronization lies in the use of a word of encoded data, modulated and transmitted in the same way as the useful data of the signal. It may be inserted at the sumbol frequency, or at a lower frequency.

After demodulation, the receiver carries out an operation of demodulation at the binary level, and not at the level of the waveforms as in the previous embodiments, to detect the possible shifting of the demodulation comb. The result of this operation is the signal of assistance in the acquisition of the AFC.

The analysis made on the distribution of the reference carrier frequencies is also valid for the distribution of the eliminated frequencies and of the words of encoded data.

Using these three types of synchronization pattern, the operation proper for the acquisition of the AFC may be carried out in two ways. It is possible to act on the local oscillator either in such a way as to bring it to the nominal position corresponding to the frequency of the transmitted signal or in such a way as lock it into the frequency comb closest to its inherent frequency of oscillation. In the latter case, the receiver knows the shift in number of points at the output of the Fourier transform, which it takes into account in the decoding procedures.

Figure 5:
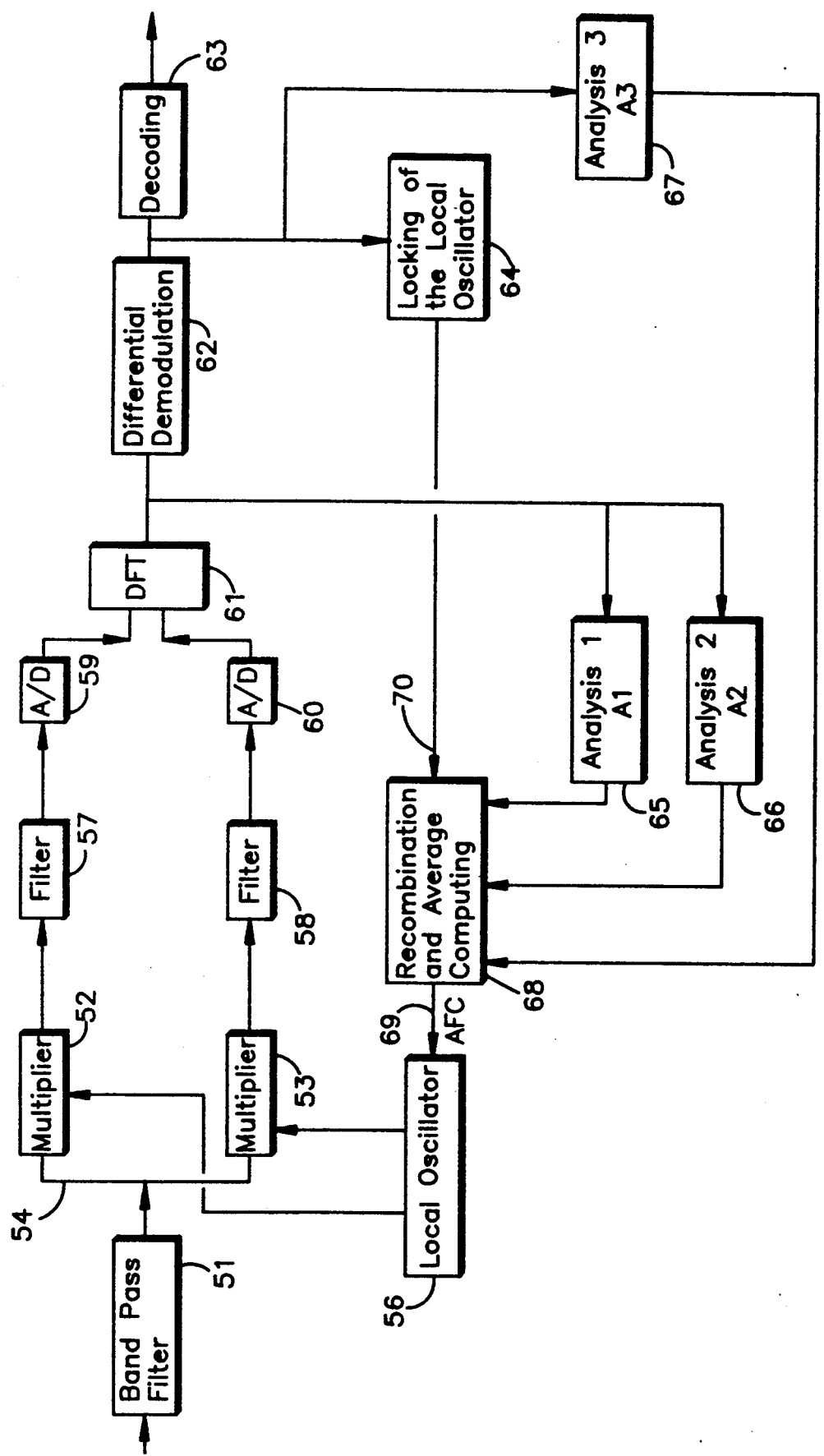
FIG. 5 is a block diagram of a receiver according to the invention, using all three types of frequency synchronization pattern.

FIG. 5 shows a block diagram of a receiver making use of the three types of patterns of frequency synchronization according to the invention.

In a standard way, this receiver has a bandpass filter 51, two multipliers 52 and 53, computing the products of the received signal 54 and the signals in phase quadrature generated by the local oscillator 56. These signals are then filtered (57, 58), then digitized by analog/digital converters 59, 60. A discrete Fourier transform 61 is then carried out, followed by a differential demodulation 62 and a decoding 63.

In a known way, the locking of the local oscillator 56 is done by the locking module 64, by carrying the demodulated signal to the power of 4 (in the case of a modulation with four phase states) and an integration of this demodulated signal.

According to the invention, a module 65 for the analysis of the pattern of frequential synchronization constituted by reference carriers, and a module 66 for the analysis of the pattern of frequential synchronization constituted by eliminated carriers receive the data produced by the Fourier transform 61.

A digital correlation module 67 carries out the analysis of the pattern of synchronization formed by a data word, using demodulated data.

A recombination and average-computing module 68 generates the AFC 69 from the locking signal 70 and from pieces of information coming from the analysis modules 65, 66 and 67.

Evidently, the implementation of these different methods is optional in each of the receivers. Indeed, a reciever may work without any means of analysis of these patterns of frequential synchronization, or with only one type of pattern, or any possible combination.

What is claimed is:

1. A method for broadcasting and reception of digital data in the form of a series of data elements allowing for the control of the tuning of a local oscillator in a receiver of said digital data, the method comprising the steps of:

provinding a plurality of orthogonal frequency carriers to be simultaneously transmitted;

forming successive symbols by simultaneously modulating each of said frequency carriers with selected data elements picked up out of said series of data elements, said selected data elements being associated with only one of said frequency carriers such that two successive elements of said series of data elements are prevented from being transmitted using the same frequency carrier;

periodically inserting in at least some of said symbols a frequential synchronization pattern, said pattern comprising at least one frequency carrier having predetermined characteristics which are known to at least some receivers;

transmitting said symbols;

receiving said symbols;

extracting said inserted frequential synchronization pattern from said received symbols;

analyzingly recognizing said extracted frequential synchronization pattern;

generating a control signal representative of said recognized frequential synchronization pattern; and tuning a local oscillator as a function of said control signal.

2. The method according to claim 1 wherein said frequential synchronization pattern comprises a symbol having at least one reference frequency carrier, the frequency of which being known and recognizable to said receivers.

3. The method according to claim 1 wherein said frequential synchronization pattern comprises a symbol in which at least one of said frequency carriers is eliminated so as to create at least one gap in the frequency spectrum covered by said plurality of frequency carriers, the frequential position of said at least one gap being known and recognizable to said receivers.

4. The method according to claim 1 wherein said frequential synchronization pattern comprises a predetermined modulation of at least one predetermined frequency carrier of said plurality of orthogonal frequency carriers, the modulation being known and recognizable to said receivers.

5. A method for broadcasting and reception of digital data in the form of a series of data elements allowing for the control of the tuning of a local oscillator in a receiver of said digital data, the method comprising the steps of:

providing a plurality of orthogonal frequency carriers to be simultaneously transmitted;

forming successive data symbols by simultaneously modulating each of said frequency carriers with selected data elements picked up out of said series of data elements, each of said selected data elements being associated with only one of said frequency carriers such that two successive elements of said series of data elements are prevented from being transmitted using the same frequency carrier;

periodically inserting among said data symbols a frequential synchronization pattern comprising at least one reference frequency carrier, the frequency of which being known and recognizable to the receivers;

transmitting said symbols;

receiving said symbols;

extracting said frequency synchronization symbol from the received symbols;

generating a control signal representative of the extracted frequential synchronization pattern; and tuning a local oscillator as a function of said control signal.

6. The method according to claim 5 or 2 wherein said frequential synchronization pattern includes at least three reference frequency carriers distributed in such a way that the frequential pitch between two frequentially consecutive reference frequency carriers is not constant.

7. The method according to claim 5 or 2 wherein said reference frequency carriers are modulated by selected data elements picked up out of said series of data elements.

8. The method according to claim 5 or 2 wherein each of said reference frequency carriers has a predetermined phase, said phases being distributed such that a resulting modulation envelope is substantially constant.

9. The method according to claim 8 wherein said predetermined phases of each of said reference frequency carriers are distributed according to the criterion of quadratic distribution.

10. A method for broadcasting and reception of digital data in the form of a series of data elements allowing for the control of the tuning of a local oscillator in a receiver of said digital data, the method comprising the steps of:

providing a plurality of orthogonal frequency carriers to be simultaneously transmitted;

forming successive symbols by simultaneously modulating each of said frequency carriers with selected data elements picked up out of said series of data elements, each of said selected data elements being associated with only one of said frequency carriers such that two successive elements of said series of data elements are prevented from being transmitted using the same frequency carrier;

periodically eliminating at least one of said frequency carriers in a data symbol to form a frequential synchronization pattern consisting of gaps in the frequency spectrum covered by said plurality of frequency carriers, the frequential position of said gaps being known and recognizable to the receivers;

transmitting said symbols;

receiving said symbols;

extracting said frequential synchronization pattern from the received symbols;

generating a control signal representative of the extracted frequential synchronization pattern; and tuning a local oscillator as a function of the control signal.

11. A method for broadcasting and reception of digital data in the form of a series of data elements allowing for the control of the tuning of a local oscillator in a receiver of said digital data, the method comprising the steps of:

providing a plurality of orthogonal frequency carriers to be simultaneously transmitted;

forming successive data symbols by simultaneously modulating each of said frequency carriers with selected data elements picked up out of said series of data elements, each of said selected data elements being associated with only one of said frequency carriers such that two successive elements of said series of data elements are prevented from being transmitted using the same frequency carrier;

periodically inserting among said series of data a frequential synchronization pattern recognizable by the receivers, said frequential synchronization pattern comprising a predetermined modulation of at least one predetermined frequency carrier from said plurality of orthogonal frequency carriers;

transmitting said symbols;

receiving said symbols;

extracting said frequential synchronization pattern from the received symbols;

generating a control signal representative of the extracted frequential synchronization pattern; and tuning a local oscillator as a function of said control signal.

12. The method according to claim 10 or 3 wherein at least three frequency carriers are eliminated, the three frequency carriers being selected such that the frequential pitch between two frequentially consecutive eliminated frequency carriers is not constant.

13. The method according to claim 11 or 4 wherein said frequential synchronization pattern consists in modulating with predetermined data elements at least three predetermined frequency carriers of a data symbol, the frequential pitch between two frequentially consecutive predetermined frequency carriers not being constant.

* * * * *